US011832166B2

(12) United States Patent
Ina

(10) Patent No.: US 11,832,166 B2
(45) Date of Patent: Nov. 28, 2023

(54) COMMUNICATION APPARATUS, CONTROL METHOD, AND STORAGE MEDIUM

(71) Applicant: CANON KABUSHIKI KAISHA, Tokyo (JP)

(72) Inventor: Eigoro Ina, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 17/313,850

(22) Filed: May 6, 2021

(65) Prior Publication Data

US 2021/0266824 A1  Aug. 26, 2021

Related U.S. Application Data

(63) Continuation of application No. PCT/JP2019/041595, filed on Oct. 24, 2019.

(30) Foreign Application Priority Data

Nov. 8, 2018 (JP) .................. 2018-210842

(51) Int. Cl.
G08C 17/00 (2006.01)
H04W 48/16 (2009.01)
H04W 52/02 (2009.01)
H04W 84/12 (2009.01)

(52) U.S. Cl.
CPC ....... *H04W 48/16* (2013.01); *H04W 52/0235* (2013.01); *H04W 84/12* (2013.01)

(58) Field of Classification Search
CPC . H04W 48/16; H04W 52/0235; H04W 52/02; H04W 52/0216; H04W 52/0229; H04W 84/12; H04W 84/18

USPC ............................................ 370/311
See application file for complete search history.

(56) References Cited

U.S. PATENT DOCUMENTS

| 2018/0376419 A1* | 12/2018 | Li .................. H04W 52/0222 |
| 2019/0141631 A1* | 5/2019 | Patil .............. H04W 52/0229 |
| 2019/0223101 A1* | 7/2019 | Li .................. H04W 52/0229 |
| 2020/0015219 A1* | 1/2020 | Asterjadhi ........ H04W 72/23 |

FOREIGN PATENT DOCUMENTS

WO    2018/038532 A1    3/2018

OTHER PUBLICATIONS

Roger Marks, et al., Further Consideration on Smart Scanning Usage Model, IEEE 802.11-17/1644r1, Nov. 2017, (URL: https://mentor.ieee.org/802.11/dcn/17/11-17-1644-01-00ba-further-consideration-on-smart-scanning-usage-model.pptx).
Guoqing Li, et al., WUR discovery frame format, IEEE 802.11-18/0473r5, Apr. 2018, (URL: https://mentor.ieee.org/802.11/dcn/18/11-18-0473-05-00ba-wur-discovery-frame-format.pptx).
Guoquing Li, et al., WUR Discovery Frame for Smart Scanning, IEEE 802.11-17/1608r5, Nov. 2017, (URL: https://mentor.ieee.org/802.11/dcn/17/11-17-1608-05-00ba-wur-discovery-frame-for-smart-scanning.pptx).

* cited by examiner

*Primary Examiner* — Temica M Beamer
(74) *Attorney, Agent, or Firm* — Canon U.S.A., Inc. IP Division

(57) ABSTRACT

In a case where a wireless signal is received by Wake Up Radio (WUR), processing of searching for a new connection destination of Primary Connectivity Radio (PCR) is started based on signal strength or signal quality of the wireless signal.

9 Claims, 3 Drawing Sheets

COMMUNICATION APPARATUS, CONTROL METHOD, AND STORAGE MEDIUM

CROSS-REFERENCE TO RELATED APPLICATIONS

This application is a Continuation of International Patent Application No. PCT/JP2019/041595, filed Oct. 24, 2019, which claims the benefit of Japanese Patent Application No. 2018-210842, filed Nov. 8, 2018, both of which are hereby incorporated by reference herein in their entirety.

BACKGROUND OF THE INVENTION

Field of the Invention

The present invention relates to an apparatus that searches for a connection destination of wireless connection.

Background Art

Currently, for the Institute of Electrical and Electronics Engineers (IEEE) 802.11ba whose standardization is in progress, there is proposed a configuration in which a communication apparatus includes, in addition to a conventional wireless LAN transmitter/receiver (Primary Connectivity Radio (PCR)), a receiver called Wake Up Radio (WUR) that operates with low power consumption (PTL 1).

The IEEE 802.11ba prescribes a WUR mode, and an Access Point (AP) regularly transmits a WUR Beacon. Meanwhile, a Station (STA) receives the WUR Beacon, and can thereby maintain synchronization with the AP without performing communication using the PCR.

In a case where data desired to be transmitted from the STA to the AP in the WUR mode is generated, the STA can terminate the WUR mode, and transmit the data from the PCR of the STA to the AP. In a case where data to be transmitted from the AP to the STA is generated in the WUR mode, the AP can cause the STA to terminate the WUR mode by transmitting a WUR Wake-up frame to the WUR of the STA, and cause the PCR of the STA to receive the data from the AP.

Here, the IEEE 802.11ba prescribes that the data rate of the WUR Beacon is 62.5 kbps or 250 kbps. In contrast, the IEEE 802.11 prescribes that a normal Beacon (hereinafter, PCR Beacon) has the data rate of 1 Mbps in the 2.4 GHz band, and the data rate of 6 Mbps in the 5 GHz band.

Digital wireless communication requires, in general, a different necessary Signal Noise Ratio (SNR), which is the ratios of signals to noise, of a signal depending on a data rate used in the communication. A high SNR is required for a high data rate signal, whereas a low SNR signal can be transmitted when the data rate of the signal is low. Thus, a lower data rate signal can be transmitted farther than a high data rate signal when these signals have the same transmission output.

CITATION LIST

Patent Literature

PTL 1: United States Patent Application Publication No. 2018/0234918

SUMMARY OF THE INVENTION

The present invention is directed to enable a search for a new connection destination early, in a case where it is difficult to perform data communication with other communication apparatus.

In view of the above-described issue, a communication apparatus according to the present invention includes a first communication unit configured to perform communication conforming to Institute of Electrical and Electronics Engineers (IEEE) 802.11 series standard with another communication apparatus being connected, a second communication unit configured to perform communication using WUR in IEEE 802.11ba standard with the other communication apparatus, a determination unit configured to determine, in a case where a first wireless signal is received by the second communication unit, signal strength or signal quality of the first wireless signal, and a search unit configured to start search processing of searching for a new connection destination using the first communication unit, based on a result of determination by the determination unit.

According to the present invention, it is possible to start a search for a new connection destination early, in a case of a situation where it is difficult to perform data communication with other communication apparatus.

Further features of the present invention will become apparent from the following description of exemplary embodiments with reference to the attached drawings.

DESCRIPTION OF THE EMBODIMENTS

In a case where a Primary Connectivity Radio (PCR) Beacon and a Wake Up Radio (WUR) Beacon are transmitted with the same transmission output, the data rate of the WUR Beacon is lower and thus the signal reaches a farther Station (STA). Thus, the STA can receive the WUR Beacon, and the STA can maintain connection with an Access Point (AP) in a WUR mode. However, there may occur a case where, after terminating the WUR mode, the STA cannot receive the PCR Beacon and thus cannot perform data communication with the AP.

Even in such a case, the STA having terminated the WUR mode does not recognize that the data communication with the AP using the PCR cannot be performed. Thus, the STA first operates the PCR for a predetermined time, confirms whether it is possible to perform the data communication with the AP, and subsequently, starts searching for an AP to be a new connection destination. This results in an increase in the time during which the STA cannot perform the data communication.

In view of the above-described issue, the present invention is directed to enable a search for a new connection destination early, in a case where it is difficult to perform data communication with other communication apparatus.

Figure 1:
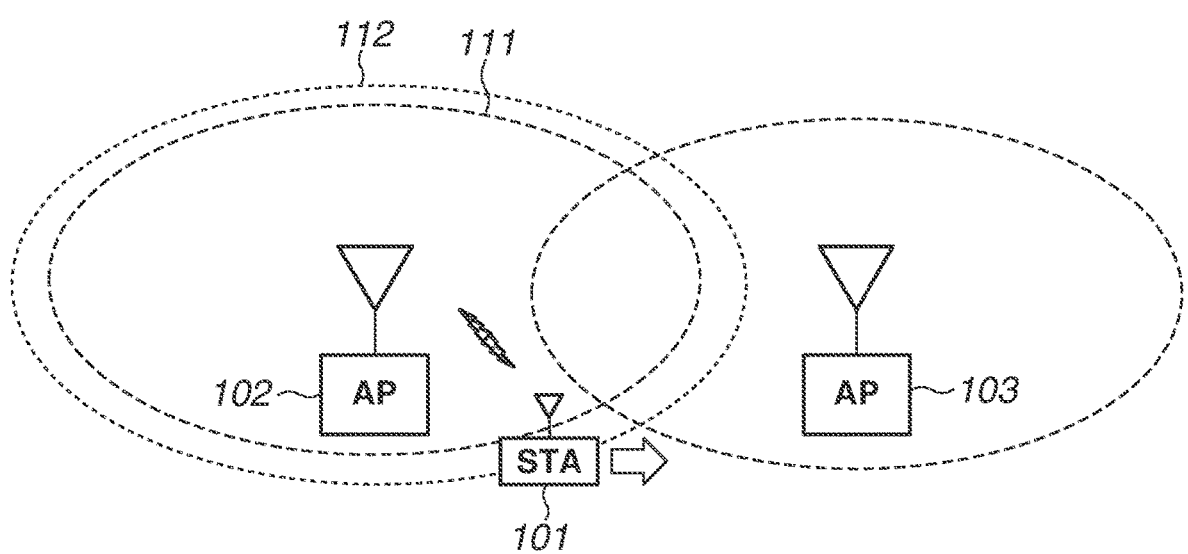
FIG. 1 illustrates a wireless network.

FIG. 1 illustrates a wireless network configuration according to the present exemplary embodiment. A Station (STA) 101 is a Wake Up Radio (WUR) non-Access Point (AP) STA conforming to the Institute of Electrical and Electronics Engineers (IEEE) 802.11ba standard, and is a communication apparatus having a Primary Connectivity Radio (PCR) and a WUR in the IEEE 802.11ba standard, as described below.

The STA 101 establishes a wireless connection with an AP 102, by performing, for example, Association and Authentication, conforming to the IEEE 802.11 series standard, using the PCR. The STA 101 can perform data communication with the AP 102, by transmitting and receiving frames conforming to the IEEE 802.11 series standard, using the PCR.

The STA 101 operates in a WUR mode conforming to the IEEE 802.11ba standard, and receives a WUR Beacon transmitted from the AP 102, using the WUR, thereby maintaining synchronization with the AP 102. In this period, the STA 101 can reduce power consumption for the communication with the AP 102, by bringing the PCR into a Doze state in the IEEE 802.11 series standard. The Doze state is a power-saving state in which a function of transmitting and receiving signals using the PCR to and from the AP 102 is stopped.

In a case where data to be transmitted to the AP 102 is generated, the STA 101 operating in the WUR mode can terminate the WUR mode, and transmit the data from the PCR of the STA 101 to the AP 102. In a case where the WUR of the STA 101 receives a WUR Wake Up frame conforming to the IEEE 802.11ba standard from the AP 102, the STA 101 can terminate the WUR mode, and receive data from the AP 102, using the PCR of the STA 101.

In the present exemplary embodiment, the STA 101 is moving, and the direction thereof is a direction of the STA 101 moving away from the AP 102, and is also a direction of the STA 101 approaching an AP 103. The STA 101 is also set to be connectable to both the AP 102 and the AP 103.

The AP 102 is a WUR AP conforming to the IEEE 802.11ba standard, and also has a PCR and a WUR in the IEEE 802.11ba standard. The PCR of the AP 102 forms a wireless network conforming to the IEEE 802.11 series standard. A broken line of an oval 111 illustrated in FIG. 1 indicates a range (a communicable range) in which a beacon transmitted by the PCR of the AP 102 reaches. The beacon transmitted by the PCR of the AP 102 is, for example, a PCR Beacon conforming to the IEEE 802.11ba standard. The PCR Beacon includes information indicating that the AP 102 conforms to the IEEE 802.11ba.

The WUR of the AP 102 transmits a WUR Beacon conforming to the IEEE 802.11ba standard. The WUR Beacon is transmitted to each WUR non-AP STA or to a plurality of non-AP STAs grouped together, and the WUR Beacon also includes Timing Synchronization Function (TSF) information for maintaining synchronization with the AP 102. A broken line of an oval 112 illustrated in FIG. 1 indicates a range in which the WUR Beacon transmitted by the WUR of the AP 102 reaches.

The PCR and the WUR of the AP 102 transmit the respective beacons (the PCR Beacon and the WUR Beacon) with substantially equal transmission outputs. Here, the data rate of the WUR Beacon is 62.5 kbps or 250 kbps, and the data rate of the PCR Beacon is 1 Mbps (in a case of 2.4 GHz band) or 6 Mbps (in a case of 5 GHz band). The oval 112, which is a range the WUR Beacon reaches, is larger (wider) than the oval 111, which is a range the PCR Beacon reaches, even if the transmission output of the PCR Beacon transmitted by the PCR and the transmission output of the WUR Beacon transmitted by the WUR are the same. Here, the range a Beacon reaches refers to a range in which the Beacon can be demodulated.

The data rate of the PCR Beacon is the lowest modulation rate among modulation rates that can be used in the communication of the PCR. The PCR and the WUR of the AP 102 transmit the beacons using the same frequency channel. However, these are not limited thereto, and may transmit the beacons using different frequency channels.

The STA 101 may be, for example, an image input apparatus, such as an imaging apparatus (e.g., a camera, and a video camera), and a scanner, or may be an image output apparatus, such as a printer (e.g., a Single Function Printer (SFP) and a Multi-Function Printer (MFP)), a copier, and a projector. The STA 101 may also be a storage device, such as a hard disk drive and a memory device, or may be an information processing apparatus, such as a personal computer and a smartphone. The STA 101 may also be an Internet of Things (IoT) device, such as a sensor that can be connected to the Internet via the AP 102.

Figure 2:
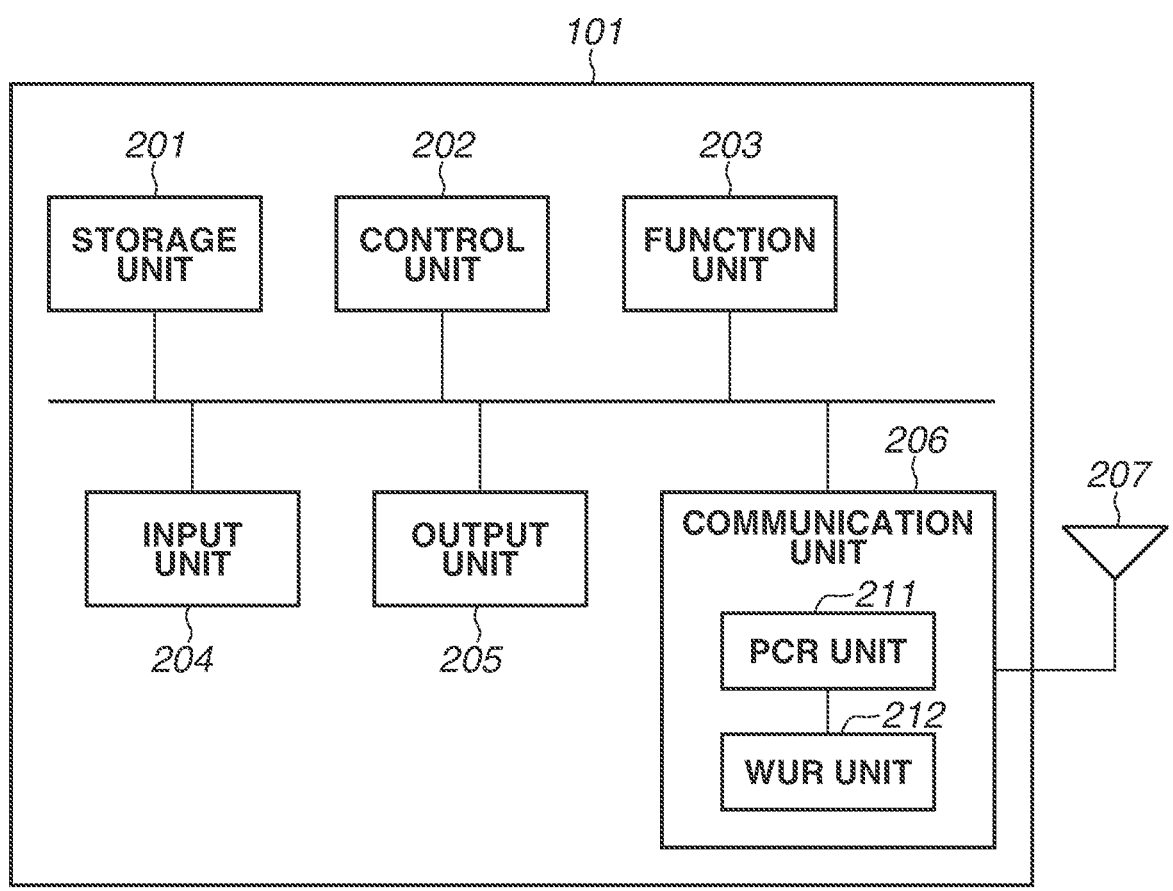
FIG. 2 is a hardware block diagram of a Station (STA).

FIG. 2 illustrates a hardware configuration of the STA 101.

A storage unit 201 is composed of one or more memories, such as a ROM and a RAM. The storage unit 201 stores a program for performing various kinds of operation described below, and various kinds of information, such as communication parameters for wireless communication. In addition to the memories, such as a ROM and a RAM, storage mediums, such as a flexible disk, a hard disk, an optical disc, a magneto-optical disk, a Compact Disc (CD)-ROM, a CD Recordable (CD-R), a magnetic tape, a nonvolatile memory card, or a Digital Versatile Disc (DVD) can be used for the storage unit 201.

A control unit 202 is composed of one or more processors, such as a Central Processing Unit (CPU) and a Micro Processing Unit (MPU). The control unit 202 controls the entire AP 102 by executing a program stored in the storage unit 201. The control unit 202 may control the entire AP 102 by cooperating with a program and an Operating System (OS) stored in the storage unit 201. The control unit 202 may include a plurality of processors, such as a multi-core processor, and may control the entire AP 102 using the plurality of processors.

The control unit 202 controls a function unit 203 to execute predetermined processing, such as imaging, printing, and projection. The function unit 203 is a piece of hardware for the AP 102 to execute the predetermined processing. In a case where the AP 102 is, for example, a camera, the function unit 203 is an imaging unit and performs imaging processing. In a case where the AP 102 is, for example, a printer, the function unit 203 is a printing unit and performs printing processing. In a case where the AP 102 is, for example, a projector, the function unit 203 is a projection unit and performs projection processing. Data to be processed by the function unit 203 may be data stored in the storage unit 201, or may be data acquired in communication with other communication apparatus via a communication unit 206 described below.

An input unit 204 accepts various operations from a user. An output unit 205 provides various outputs to a user. Here, the output from the output unit 205 includes at least one of display on a screen, a voice output from a speaker, and a vibration output. Both the input unit 204 and the output unit 205 may be combined to be a single module, as with a touch panel. The communication unit 206 controls an antenna 207 to transmit and receive wireless signals for wireless communication.

The communication unit 206 further includes a PCR unit 211 and a WUR unit 212. The PCR unit 211 controls wireless communication conforming to the IEEE 802.11 series standard. The WUR unit 212 periodically waits to receive a signal, such as the WUR Beacon and the WUR Wake-up frame, in a case where the WUR mode is started. The WUR unit 212 has a function of notifying the PCR unit 211 of this reception and terminating the WUR mode when the WUR unit 212 receives the WUR Wake-up frame. During the period of the WUR mode, the PCR unit 211 stops the function of transmitting and receiving signals to save power. The WUR unit 212 is in charge of most of the function of the communication unit 206, accordingly.

The PCR unit 211 and the WUR unit 212 have a function of notifying the control unit 202 of the value of a Received Signal Strength Indicator (RSSI) indicating the signal strength of the received wireless signal, and can record the values of RSSIs of the past in the storage unit 201 via the control unit 202.

Note that the PCR unit 211 and the WUR unit 212 are each configured as an independent Radio Frequency (RF) circuit. However, the PCR unit 211 and the WUR unit 212 are not limited thereto, and may be configured as a unified RF circuit. In this case, the STA 101 enables a function of serving as the PCR unit 211, in a case of bringing the PCR into an Awake state. In contrast, the STA 101 disables the function of serving as the PCR unit 211, in a case of bringing the PCR into the Doze state. The STA 101 controls the WUR in a similar manner. In a case where the function of serving as the WUR unit 212 is enabled, the RF circuit in which the WUR unit 212 and the PCR unit 211 are unified operates with less power than in a case where the function of serving as the PCR unit 211 is enabled. In the case where the PCR unit 211 and the WUR unit 212 are configured as the unified RF circuit, this RF circuit itself is the PCR unit 211 in the case where the function of serving as the PCR unit 211 is enabled. In contrast, in the case where the PCR unit 211 and the WUR unit 212 are configured as the unified RF circuit, this RF circuit itself is the WUR unit 212 in the case where the function of serving as the WUR unit 212 is enabled.

Figure 3:
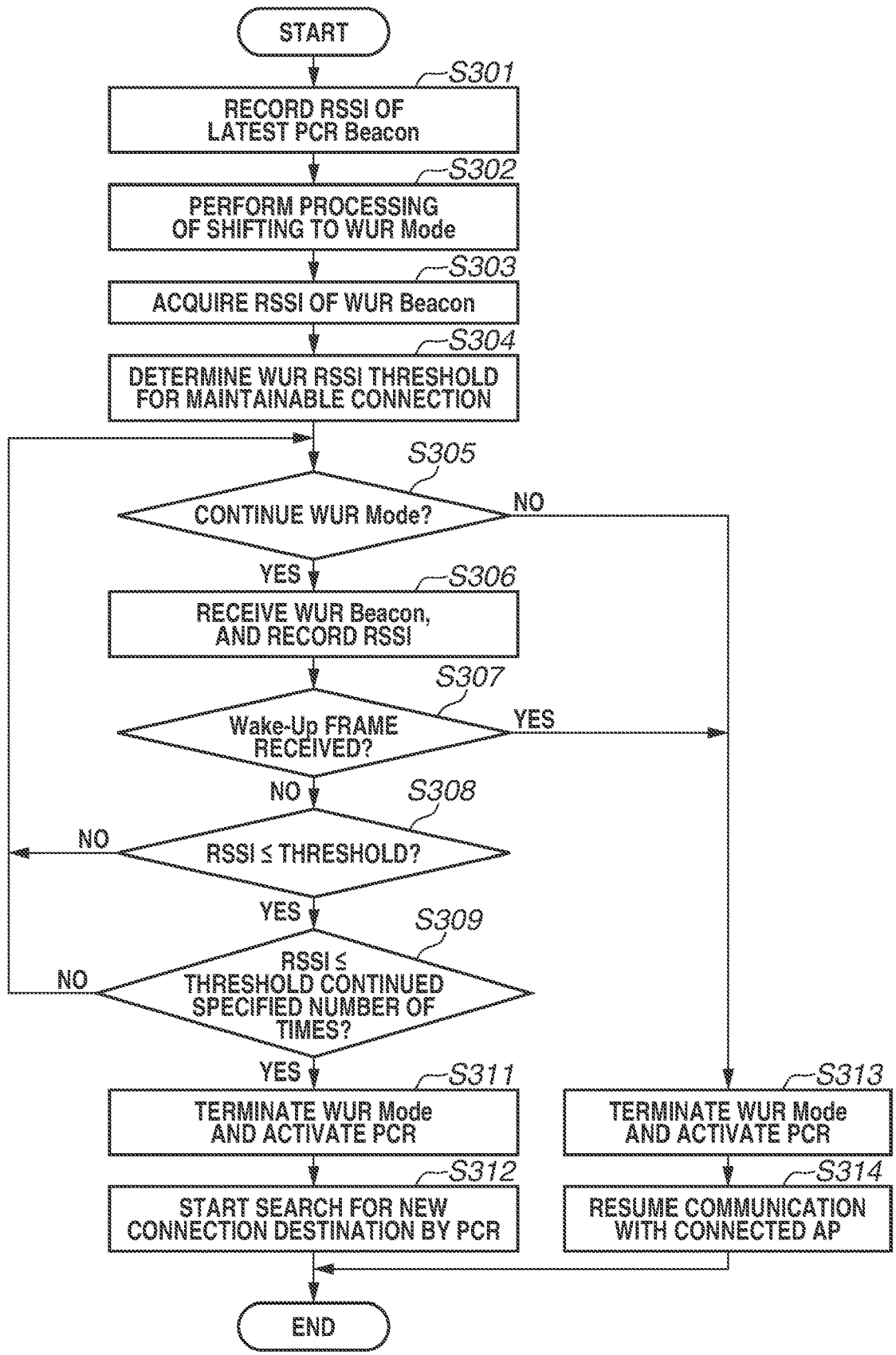
FIG. 3 is a flowchart illustrating a flow implemented by the STA.

FIG. 3 illustrates a flowchart illustrating a flow that begins in a case where the PCR unit 211 of the STA 101 establishes wireless connection with the AP 102 conforming to the IEEE 802.11ba. The STA 101 is assumed to have received the PCR Beacon regularly transmitted by the AP 102 when establishing the wireless connection with the AP 102. Information indicating that the AP 102 conforms to the IEEE 802.11ba is included in the PCR Beacon transmitted from the AP 102. The STA 101 can thus determine that the AP 102 with which the wireless connection has been established supports the IEEE 802.11ba, by receiving this beacon.

The control unit 202 reads out a program stored in the storage unit 201 of the STA 101 and executes the read-out program, so that the flow in the flowchart illustrated in FIG. 3 is implemented. There may also be adopted such a configuration that some or all of steps illustrated in the flowchart in FIG. 3 are implemented by, for example, a piece of hardware such as an Application Specific Integrated Circuit (ASIC).

In step 301, the STA 101 receives the PCR Beacon regularly transmitted by the AP 102, and records the RSSI of the PCR Beacon in the storage unit 201. The STA 101 may record the RSSI of the PCR Beacon received immediately before the establishment of the wireless connection with the AP 102 in the storage unit 201.

In step S302, the STA 101 performs processing of shifting to the WUR mode with the AP 102. Specifically, at first, the PCR unit 211 of the STA 101 transmits an Enter WUR Mode Request frame, which is a request for starting the WUR mode, to the AP 102. The Enter WUR Mode Request frame includes cycle information (Duty Cycle Period) indicating a cycle (a reception interval) of a time period in which the WUR unit 212 waits to receive a signal from the WUR of the AP 102.

The AP 102 determines the reception interval included in the Enter WUR Mode Request frame, as a transmission interval (WUR duty Cycle) of the WUR Beacon. The AP 102 transmits an Enter WUR Mode Response frame including start timing information (Starting Time of the WUR Duty Cycle) indicating a timing for starting the transmission interval.

Upon receiving the Enter WUR Mode Response frame, the PCR unit 211 of the STA 101 causes the WUR unit 212 to start waiting to receive a signal at the timing based on the start timing information. The PCR unit 211 then shifts to the Doze state. In this way, the STA 101 shifts to the WUR mode. Both the Enter WUR Mode Request frame and the Enter WUR Mode Response frame are action frames conforming to the IEEE 802.11 series standard.

After shifting to the WUR mode, in step S303, the STA 101 receives the WUR Beacon regularly transmitted by the AP 102 with the WUR unit 212, and acquires the RSSI of the received WUR Beacon. In step S304, the STA 101 compares the acquired RSSI of the WUR Beacon with the RSSI of the PCR Beacon recorded in the storage unit 201 in step S301, and determines an RSSI threshold that allows the PCR unit 211 to maintain the connection with the AP 102.

The reason the threshold is decided by performing such a comparison is that the transmission output of the WUR Beacon transmitted by the AP 102 and the transmission output of the PCR Beacon are not necessarily the same. A specific example for deciding the RSSI threshold will now be described. Here, a method of utilizing a minimum reception sensitivity of the PCR unit 211 will be described as an example for determining the RSSI threshold. The minimum reception sensitivity is a signal strength of the received signal for enabling decoding of the lowest one of the modulation rates to be used by the PCR unit 211 for communication. The minimum reception sensitivity of the PCR unit 211 utilized here is recorded in the storage unit 201 beforehand.

The STA 101 determines the presence or absence of a relative transmission output difference, using the RSSI of the WUR Beacon recorded in step S301 and the RSSI of the PCR Beacon acquired in step S303. If the RSSI of the PCR Beacon recorded in step S301 and the RSSI of the WUR Beacon acquired in step S303 are the same, it is possible to determine that the transmission outputs of the PCR and the WUR of the AP 102 are substantially the same. At this moment, there may be a case where the WUR unit 212 can continue receiving the WUR Beacon correctly, even if the RSSI of the WUR Beacon received by the WUR unit 212 is less than the minimum reception sensitivity of the PCR unit 211. This is because the modulation rate of the WUR Beacon is lower than the modulation rate that can be used for the communication of the PCR unit 211. In such a case, even if the WUR unit 212 can correctly receive the WUR Beacon, the PCR unit 211 cannot continue the data communication with the AP 102. The STA 101 therefore determines the RSSI threshold to be a value identical to the minimum reception sensitivity of the PCR unit 211.

In contrast, in a case where the RSSI of the PCR Beacon recorded in step S301 and the RSSI of the WUR Beacon acquired in step S303 are different, the STA 101 determines the RSSI threshold to be a value obtained by adding the difference therebetween to the minimum reception sensitivity of the PCR unit 211. For example, in a case where the RSSI of the PCR Beacon is greater than the RSSI of the WUR Beacon by 3 dB, the STA 101 can determine that the transmission output of the PCR in the AP 102 is greater than that of the WUR by 3 dB. The STA 101 decides the RSSI threshold to be a value smaller than the minimum reception sensitivity of the PCR unit 211 by 3 dB, accordingly.

In deciding the RSSI threshold, the STA 101 may decide a value identical to the minimum reception sensitivity of the PCR unit 211 as the RSSI threshold, without making such an RSSI comparison.

Upon determining the RSSI threshold, in step S305, the STA 101 determines whether to continue the WUR mode. For example, the STA 101 performs the determination, based on the presence or absence of data to be transmitted from the STA 101 to the AP 102. If the data is present, the STA 101 determines not to continue the WUR mode, and if the data is absent, the STA 101 determines to continue the WUR mode. The STA 101 may also determine not to continue the WUR mode, if the WUR unit 212 cannot receive the WUR Beacon from the AP 102 for a predetermined period.

If the WUR mode is not to be continued as a result of the above-described determination (NO in step S305), the processing proceeds to step S303. In step S303, the STA 101 terminates the WUR mode, and shifts to a state where communication using the PCR unit 211 is enabled. Specifically, the STA 101 shifts the state of the PCR unit 211 from the Doze state to the Awake state that conforms to the IEEE 802.11 series standard. This is hereinafter referred to as activation. In step S304, the STA 101 then resumes the communication with the AP 102 via the PCR unit 211.

In contrast, in a case where the WUR mode is to be continued as a result of the above-described determination (YES in step S305), the processing proceeds to step S306. In step S306, the STA 101 waits to receive the WUR Beacon from the AP 102 via the WUR unit 212 at a predetermined timing. The predetermined timing is determined based on the cycle (reception interval) of the period in which the WUR unit 212 waits for a signal from the WUR of the AP 102, and the start timing information included in the Enter WUR Mode Response frame. In a case where the WUR Beacon has been received, in step S306, the STA 101 records the RSSI of this WUR Beacon in the storage unit 201.

In step S307, the STA 101 checks whether the WUR Wake-up frame to the STA 101 (to the own apparatus) has been received subsequent to the WUR Beacon, via the WUR unit 212.

If the WUR Wake-up frame to the own apparatus is received (YES in step S307), the flow proceeds to step S313. If the WUR Wake-up frame to the own apparatus has not been received (NO in step S307), in step S308, the STA 101 determines whether the RSSI recorded in step S306 is less than or equal to the threshold determined in step S304.

If the RSSI of the WUR Beacon recorded in step S306 is not less than the threshold (NO in step S308), the processing returns to step S305 again. In contrast, if the RSSI of the WUR Beacon recorded in step S306 is less than the threshold (YES in step S308), in step S309, the STA 101 determines whether the number of times the RSSI is less than the threshold has continued up to a predetermined specified number of times in succession.

Here, the predetermined specified number of times is a numerical value that can be arbitrarily set depending on how much accidental occurrence of poor communication is taken into consideration. For example, if the number is set to once, the WUR mode is terminated even if a communication state deteriorates only for a moment, such as a case where something has interrupted a communication path. If the number is set to a plurality of times, the WUR mode is terminated after the state becomes stabilized. In other words, this is the trade-off between responsiveness and power consumption. Thus, for example, when a user is prompted to select either the responsiveness or the power consumption, the specified number of times can be set to be less in a case where the responsiveness is selected to be given priority, than in a case where the power consumption is selected to be given priority. The user may also be prompted to directly input the specified number of times. The specified number of times may be set to be less in a case where the remaining battery level of the STA 101 is large, than in a case where the remaining battery level is small. Moreover, the specified number of times may be a fixed value in the STA 101.

If the number of times the RSSI is less than the threshold has not continued up to the specified number of times (NO in step S309), the processing returns to step S305 again. If the number of times the RSSI is less than the threshold has continued up to the specified number of times (YES in step S309), the STA 101 determines that it is difficult for the PCR unit 211 to continue the communication with the AP 102. In step S311, the STA 101 activates the PCR unit 211, and then in step S312, starts search processing of searching for a new connection destination using the PCR unit 211. In the search processing, the PCR unit 211 transmits a Probe Request (a search request signal) conforming to the IEEE 802.11 series standard. The PCR unit 211 receives a Probe Response (a search response signal) transmitted from, for example, the AP 103, as a response to the Probe Request, so that a new connection destination is detected. In this process, the PCR unit 211 transmits the Probe Request in a plurality of frequency channels. In addition to or in place of such an active scan, a passive scan of waiting to receive a beacon transmitted from an AP may be performed.

In step S312, the STA 101 performs the search processing while maintaining the wireless connection with the AP 102. In a case where a new connection destination is detected, the STA 101 immediately terminates the wireless connection with the AP 102, and connects to the new connection destination. For the termination of the wireless connection with the AP 102, the STA 101 transmits a Disassociation Request (a disconnection request signal) conforming to the IEEE 802.11 series standard.

In contrast, in a case where a new connection destination has not been detected, the STA 101 does not explicitly terminate the connection with the AP 102. In other words, the STA 101 may keep the PCR unit 211 on standby without transmitting the Disassociation Request, until disconnection from the AP 102 is executed by processing, such as a time-out based on a reception loss of the PCR Beacon.

In step S312, the STA 101 may terminate the wireless connection with the AP 102, when starting the search processing of searching for a new connection destination.

In the search processing, the STA 101 may perform a search for a base station of a mobile telephone network, or a Master conforming to the Bluetooth® standard, in addition to the search performed by the PCR unit 211.

According to the present exemplary embodiment, it is determined in the WUR mode that the data communication using the PCR is difficult, and a search for a new connection destination by the PCR begins, and thus it is possible to connect to the next connection destination in a short time. Therefore, the period in which data communication is impossible can be reduced, and the convenience of the user can be improved. Moreover, since it is not confirmed whether it is difficult to perform data communication in the PCR after the PCR is activated, the consumption power can be saved.

In the above-described exemplary embodiment, the STA 101 determines whether the RSSI, the received signal strength of the WUR Beacon, is less than the threshold. However, the exemplary embodiment is not limited thereto, and the STA 101 may determine whether a Signal Noise Ratio (SNR) indicating the signal quality of the WUR Beacon is less than a threshold (a threshold different from the above-described RSSI). A similar effect can thereby be obtained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. A communication apparatus comprising:
a first communication unit configured to perform communication using a Wake Up Radio (WUR) frame defined by IEEE 802.11 standard with another communication apparatus;
a second communication unit configured to perform communication using a frame that is different in type from the WUR frame and is of a predetermined type in the IEEE 802.11 standard with another communication apparatus being connected to the communication apparatus;
a decision unit configured to decide a threshold value, based on a Received Signal Strength Indicator (RSSI) of a first wireless signal constituting the frame of the predetermined type used by the second communication unit and an RSSI of a second wireless signal constituting the WUR frame used by the first communication unit, in response to the communication apparatus having started waiting to receive the WUR frame
a determination unit configured to determine, in a case where a third wireless signal constituting the WUR frame is received by the first communication unit, whether an RSSI of the third wireless signal is smaller than the decided threshold value; and
a search unit configured to start search processing of searching for a new connection destination using the second communication unit, based on a result of determination by the determination unit.

2. The communication apparatus according to claim 1, wherein the search unit starts the search processing in a case where the determination unit determines that the RSSI of the third wireless signal is smaller than the decided threshold value.

3. The communication apparatus according to claim 1, wherein the determination unit further determines each RSSI of one or more wireless signals corresponding to the WUR frame received subsequent to the third wireless signal is smaller than the decided threshold value, in addition to the determination as to whether the RSSI of the third wireless signal used by the first communication unit is smaller than the decided threshold value, and
wherein the search unit starts the search processing in a case where the determination unit determines that the RSSI of the third wireless signal and the each RSSI of the one or more wireless signals corresponding to the WUR frame received subsequent to the third wireless signal are smaller than the decided threshold value.

4. The communication apparatus according to claim 1, wherein the WUR frame is a WUR Beacon frame conforming to the IEEE 802.11 standard, and
wherein the frame of the predetermined type is a Beacon frame conforming to the IEEE 802.11 standard.

5. The communication apparatus according to claim 1, wherein the first communication unit stops waiting to receive the WUR frame in a case where the search unit starts the search processing.

6. The communication apparatus according to claim 1, wherein the search unit starts the search processing while maintaining connection with the other communication apparatus by the second communication unit.

7. The communication apparatus according to claim 6, further comprising a termination unit configured to terminate connection between the second communication unit and the other communication apparatus in a case where the new connection destination is detected by the search processing.

8. A control method for a communication apparatus, the control method comprising:
first communicating to perform communication using a Wake Up Radio (WUR) frame defined by IEEE 802.11 standard with another communication apparatus;
second communicating to perform communication using a frame that is different in type from the WUR frame and is of a predetermined type in the IEEE 802.11 standard with another communication apparatus being connected to the communication apparatus;
deciding a threshold value, based on a Received Signal Strength Indicator RSSI) of a first wireless signal constituting the frame of the predetermined type used by the second communicating and an RSSI of a second wireless signal constituting the WUR frame used by the first communicating, in response to the communication apparatus having started waiting to receive the WUR frame;
determining, in a case where the third wireless signal constituting the WUR frame is received by the first communicating, whether an RSSI of the third wireless signal is smaller than the decided threshold value; and searching to start search processing of searching for a new connection destination using the second communicating, based on a result of the determining.

9. A non-transitory computer readable storage medium storing a program for causing a computer to operate as the communication apparatus according to claim 1.

* * * * *